(12) United States Patent
Livingston

(10) Patent No.: US 8,167,569 B2
(45) Date of Patent: May 1, 2012

(54) STRUCTURE AND METHOD FOR SELF-ALIGNING ROTOR BLADE JOINTS

(75) Inventor: Jamie T. Livingston, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1165 days.

(21) Appl. No.: 11/962,874

(22) Filed: Dec. 21, 2007

(65) Prior Publication Data
US 2010/0310379 A1 Dec. 9, 2010

(51) Int. Cl.
F03D 11/00 (2006.01)
(52) U.S. Cl. ............. 416/224; 416/226; 416/228; 416/1
(58) Field of Classification Search .......... 416/1, 146 R, 416/224, 226, 228
See application file for complete search history.

(56) References Cited

U.S. PATENT DOCUMENTS

| 7,246,998 | B2 * | 7/2007 | Kovalsky et al. | ............... 416/87 |
| 7,654,799 | B2 | 2/2010 | Eyb | |
| 2007/0189895 | A1 | 8/2007 | Kootstra et al. | |
| 2009/0155084 | A1 * | 6/2009 | Livingston et al. | ....... 416/223 R |

* cited by examiner

Primary Examiner — Ninh H Nguyen
(74) Attorney, Agent, or Firm — Dority & Manning, P.A.

(57) ABSTRACT

An inventive self-aligning blade joint structure is provided to facilitate assembly and clamping of wind turbine blade sections carried on a transporter. The blade joint structure includes alignment pins on one end bulkhead of a blade body section at the joint and complimentary female bushings on a bulkhead of an adjacent blade body section to permit fine alignment of the joint. The blade joint structure also includes through holes in the end bulkheads for the adjacent blade body sections to permit clamping of the sections in preparation for application of adhesive bonding to the joint. A pair of male scarfed surfaces of spar caps extend from one blade section into the second blade section and engage female scarfed surfaces of spar caps formed in the second blade section and recessed from the joint. An inventive method is provided to utilize the self-aligning blade joint structure for assembly of the blade sections.

21 Claims, 13 Drawing Sheets

STRUCTURE AND METHOD FOR SELF-ALIGNING ROTOR BLADE JOINTS

BACKGROUND OF THE INVENTION

The invention relates generally to assembling sections of wind turbine blades and more specifically to an alignment and clamping structure and method for assembling multi-sectional wind turbine blades.

In recent years, wind turbines have become increasingly important in power generation. With increased environmental concerns related to fossil fuel power generation, wind power will grow in importance in the mix of providing electrical power. Consequently, more wind turbines will be installed. For economic reasons, it is desirable to increase the installed power per turbine. As the installed power is proportional to the diameter of the turbine rotor, the rotor sizes and turbine sizes become larger. Blade lengths continue to increase to support the higher power requirements per turbine. Typical blade lengths of current designs are up to 50 meters and greater.

Due to the often-isolated location of wind turbine farms, the rotor blades must be transported to the construction site by trucks on normal roads. The large blade size may severely limit the maneuverability of the trucks. Road transport of long, single-piece rotor blades is also very costly. Furthermore, routing of the trucks may be limited since it may be impossible to negotiate sharp turns and other interferences. Extraordinary blade length may also make loading and unloading extremely difficult. Rotor blades may require transport by ship or even helicopters to some locations.

The above-described difficulties have encouraged the development of multi-section blades. While individual sections of the multi-section blades are smaller than a one-piece blade, they are still long and heavy. Further, the blade sections must be aligned during assembly before clamping the sections together. With long and heavy blade sections, the fine alignment of the individual blade sections at the joints poses difficulty, particularly under conditions of nature that may be present at the destination windfarm sites.

Accordingly, there is a need to provide a structure for the joints of the wind turbine blades and a method that facilitates alignment and assembly.

BRIEF DESCRIPTION OF THE INVENTION

The present invention relates to an alignment and clamping structure and method for assembling multi-sectional wind turbine blades.

Briefly in accordance with one aspect of the present invention, an alignment structure for precision alignment and clamping of sections of a multi-section wind turbine blade is provided. A plurality of blade sections form joints between adjacent blade sections, including at least a first section and a second section.

A bulkhead is mounted on the inner surface of a shell of the first section at an outer end. A bulkhead is mounted on the inner surface of a shell of the second section at an inner end. One or both of these bulkheads may include a plurality of male alignment pins in predetermined locations on an exterior surface and extending normal to an exterior surface of the opposite bulkhead. One or both of these bulkheads may include a plurality of bushings in predetermined complimentary locations for receiving the plurality of male alignment pin of the opposite bulkhead. The associated male alignment pins and the bushings are precisely aligned on the exterior end surfaces of the bulkheads to facilitate mating of the first section and the second section. Both the bulkhead for the first section and the second section also include corresponding aligned through holes. When adjacent blade sections have been fully, or nearly fully engaged, the through holes may be provided with nuts and bolts or other known fastening devices to clamp the bulkheads together and thereby join the first section and second section together. With the first section and the second section clamped together in this manner, the unified blade is provided with adequate support for hoisting or movement, until the joint is permanently secured.

The joint between the first section and the second section may also include at least one shear web running longitudinally along a body of the first section. A top spar cap runs longitudinally along a body of the first section, oriented normal to a top surface of the at least one shear web. A bottom spar cap runs longitudinally along a body of the first section, oriented normal to a bottom surface of the at least one shear web. A male scarfed surface is formed at an outer end of the top spar cap and extends longitudinally by a predetermined distance beyond the outer end of the body of the first section. A male scarfed surface is formed at an outer end of the bottom spar cap and extends longitudinally by a predetermined distance beyond the outer end of the body of the first section.

At least one shear web runs longitudinally along a body of the second section. A top spar cap runs longitudinally along a body of the second section, oriented normal to a top surface of the at least one shear web. A bottom spar cap runs longitudinally along a body of the second section, oriented normal to a bottom surface of the at least one shear web. A female scarfed surface is formed at an inner end of the top spar cap of the body of the second section. A female scarfed surface is formed at an inner end of the bottom spar cap of the body of the second section.

A permanent joint is formed by the mating of the respective male scarfed surfaces and female scarfed surfaces with adhesive material applied to a space provided between the respective surfaces.

In accordance with a second aspect of the present invention, a method is provided for aligning body sections of a multi-section wind turbine blade, including a first section and a second section, during assembly. The method includes hoisting the second section. The second section is then positioned with an inner end bulkhead for the second section in proximity to the outer end bulkhead for the first section. The second section is then inserted onto the first section. Alignment of the first section and the second section is facilitated by the engagement of the male alignment pins extending from one section of the blade with the corresponding bushings. The second section is clamped to the first section, utilizing nuts and bolts or other types of fasteners through the corresponding located through holes in the bulkhead of the first section and the bulkhead of the second section. The clamped blade may then be hoisted from the transporter and set on a ground pad or other location until the scarfed joint is permanently set with the application of adhesive. It should be understood that alternatively the second section may be held fixed and the first section positioned to align and clamp with the second section.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The following embodiments of the present invention have many advantages, including providing a structure and method for precision alignment of joints between adjacent sections of a wind turbine blade.

Figure 1:
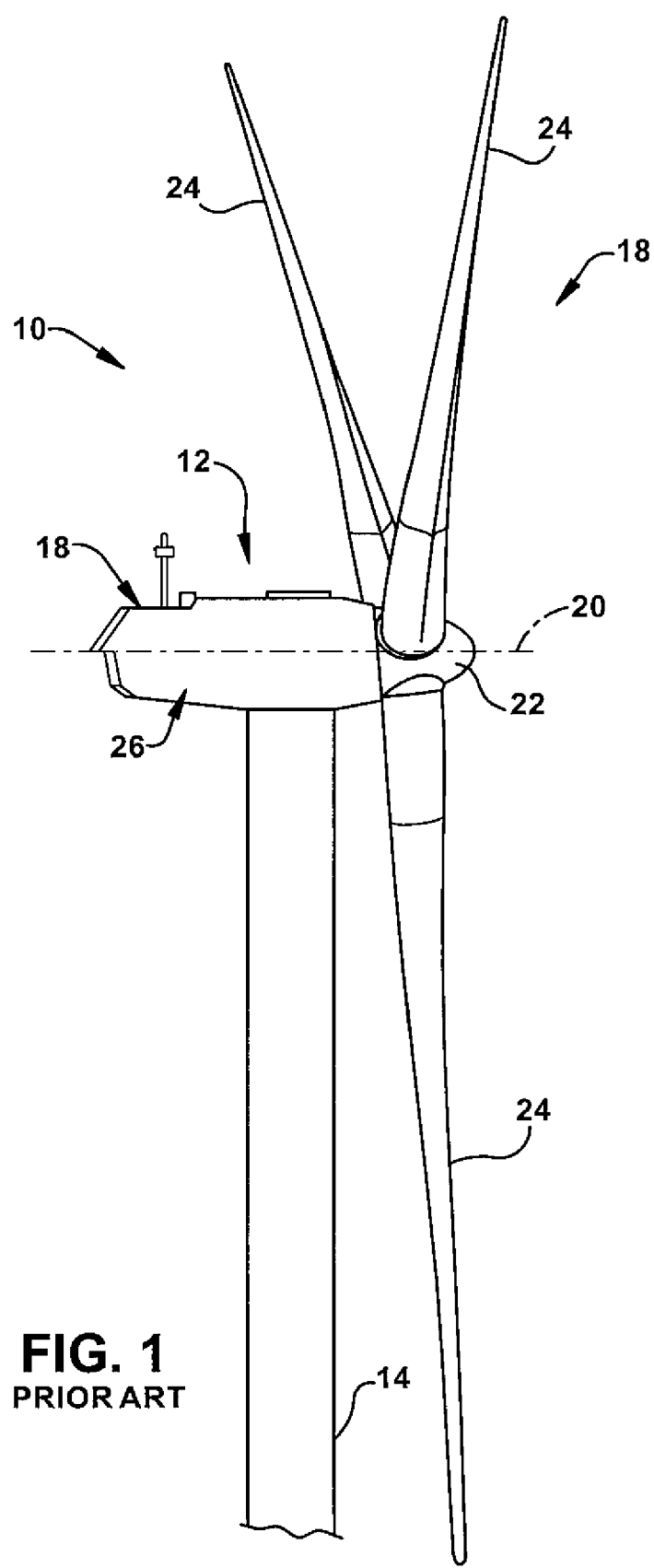
FIG. 1 illustrates an exemplary wind turbine.

FIG. 1 is a schematic illustration of an exemplary wind turbine 10. In the exemplary embodiment, wind turbine 10 is a horizontal axis wind turbine. Wind turbine 10 includes a tower 14, a nacelle 16 coupled to tower 14, and a rotor 18 coupled to nacelle 16 for rotation about an axis of rotation 20. Rotor 18 includes a rotatable hub 22 and a plurality of rotor blades ("blades") 24 coupled to hub 22. In the exemplary embodiment, rotor 18 includes three blades 24. In an alternative embodiment, rotor 18 may include more or less than three blades 24. General operation, dimensions, and configuration of wind turbine 10, and more specifically wind generator 12, is known in the art and therefore will not be described in more detail herein.

Normally the body sections of the multi-section blade may be transported to the wind farm site aboard specialized trucks. Mounted on the trucks may be fixtures for supporting and transporting a load within a frame. The fixture may include a space between defined portions of the frame. The space may be configured to receive a section of the wind turbine blade. The bed of the truck may be arranged to carry a plurality of sections of the wind turbine blades. The arrangement may include a plurality of the same section (for example, a root section) or alternatively different sections of the same blade (for example, a root section and a tip section).

Figure 2:
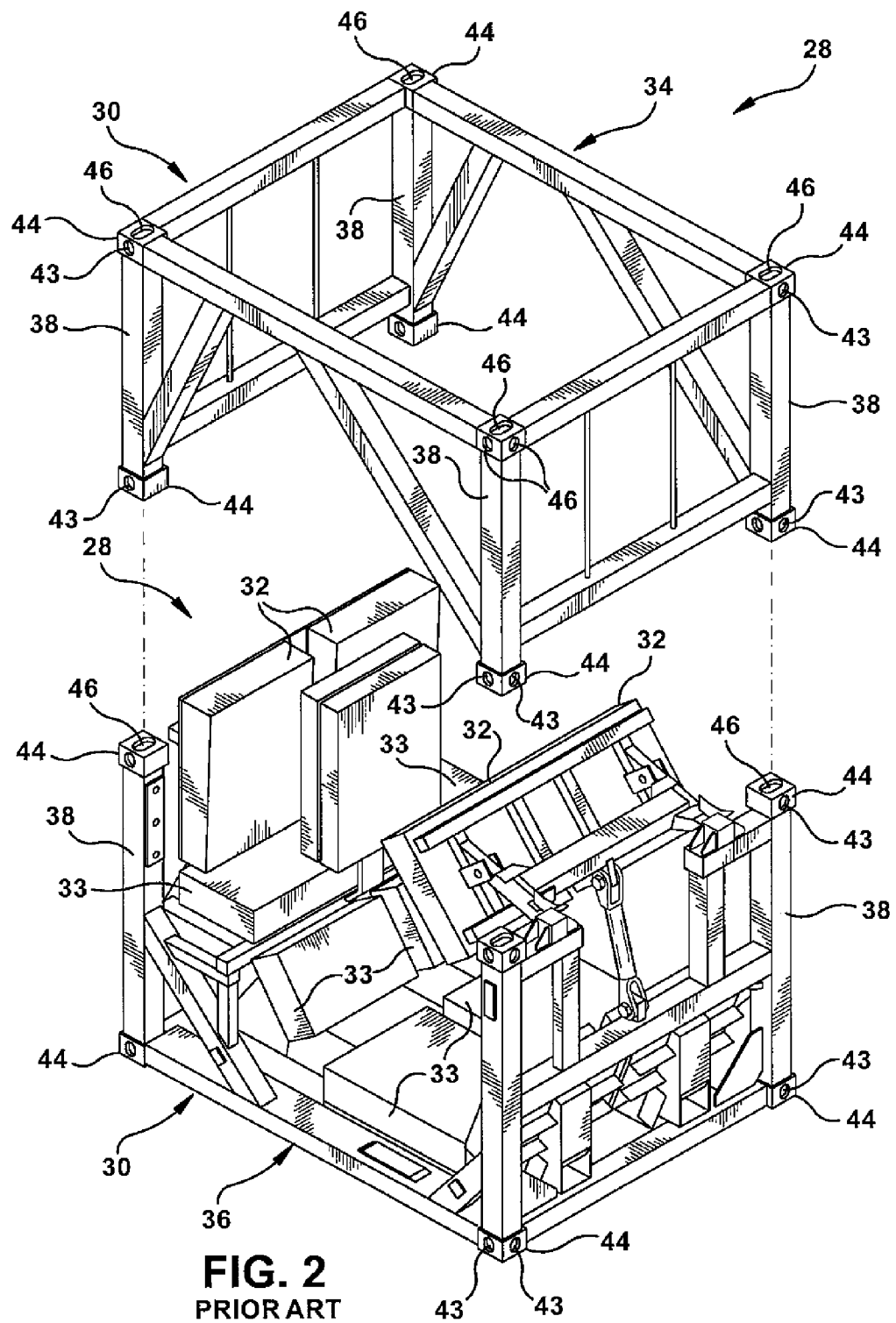
FIG. 2 is a partially exploded perspective view of a prior art fixture for supporting and/or transporting one or more of wind turbine rotor blades.

FIG. 2 is a partially exploded perspective view of a prior art fixture 28 for supporting and/or transporting one or more of wind turbine rotor blades 24 (such as shown in FIG. 1) according to Kookstra et al. (U.S Pub. No. 2007/01898895A1). Fixture 28 includes a frame 30 and a plurality of cushions 32 and 33 coupled to frame 30. Generally, fixture 28 supports at least a portion of one or more wind turbine rotor blades 24 for, for example, storage and/or transportation by any suitable means and/or method, such as, but not limited to, truck, ship, and/or rail. Generally, cushions 32 and 33 support and/or contain a portion of one or more blades 24 and may facilitate reducing or eliminating vibrational stresses and/or other forces induced into blades 24, for example during transportation, loading into fixture 28, and/or unloading from fixture 28. The frame 30 includes an upper section 34 and a lower section 36 to support, store, and/or transport blades 24. Upper and lower sections 34 and 36 may be coupled together in any suitable manner, fashion, arrangement, configuration, orientation, and/or by any suitable structure and/or means. In some embodiments, two fixtures 28 may be coupled together in any suitable manner, fashion, arrangement, configuration, orientation, and/or by any suitable structure and/or means (side-by-side, for example). In the exemplary embodiment of Kookstra, one or more end portions 44 of legs 38 that are opposite leg end portions 40 include an opening 46 and/or an extension (not shown) for interconnection with an opening 46 and/or extension of a corresponding leg 38 on a section 34 or 36 of another fixture 28 to facilitate stacking two fixtures 28, for example (not shown).

Figure 3:
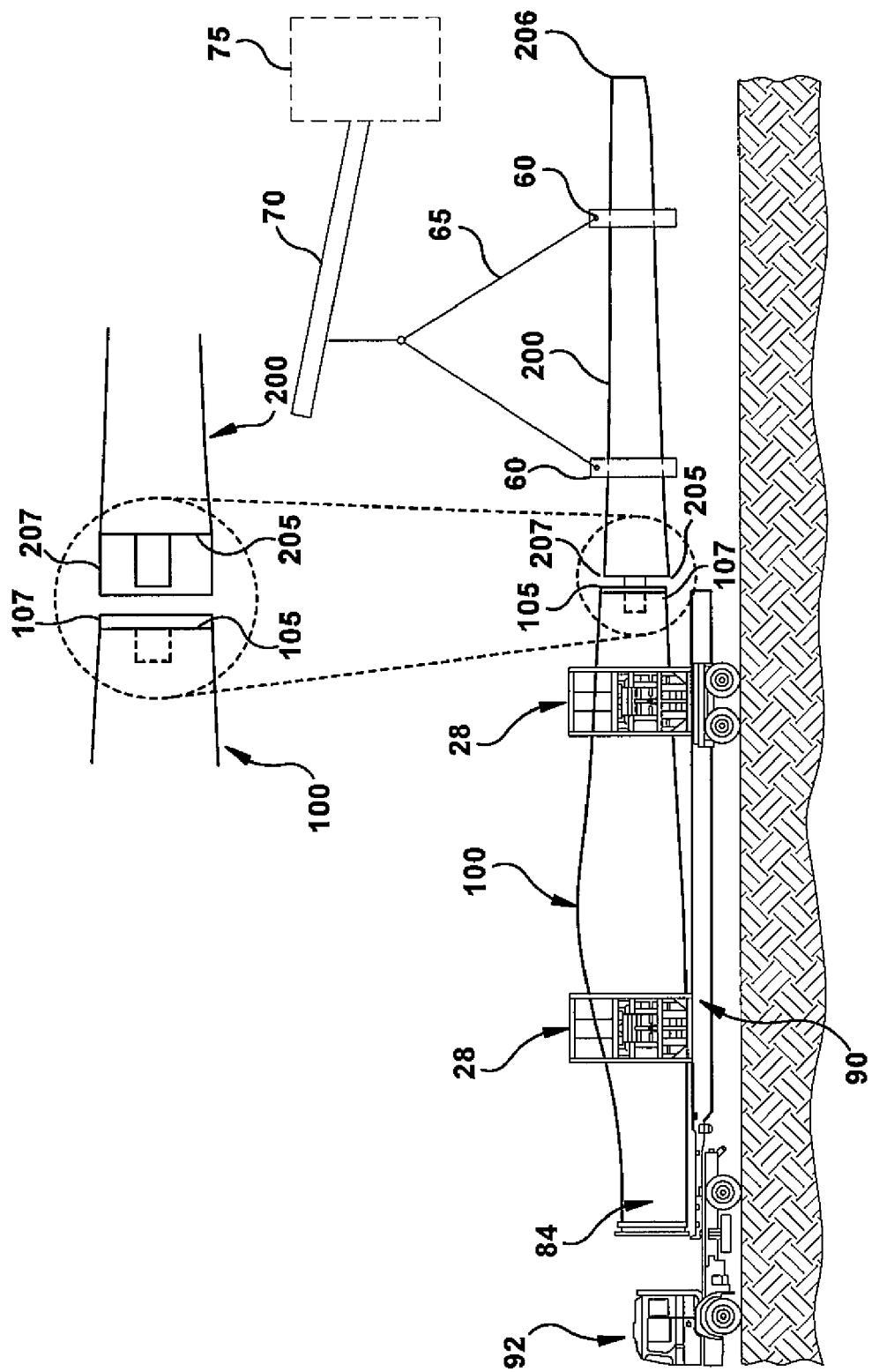
FIG. 3 illustrates a method for assembling an embodiment of a multi-section wind turbine blade with a first section hoisted mounted on a transporter and a second section hoisted by a crane.

FIG. 3 illustrates a method for assembling an embodiment of a multi-section wind turbine blade with a first section mounted on a transporter and a second section hoisted by a crane. The transporter may be a truck 92 with a flat bed 90. Two fixtures 28 provide support for the first section of the blade, which may be a root or hub section. The blade has a hub end 84 and an outer end 105. A second section 200 of the blade is held by hoisting collars 60 and rigging 65 as positioned by crane arm 70 of crane 75. The second section 200 may be positioned in proximity to first blade section 100 for alignment and assembly of the joint between the outer end 105 and the inner end 205 of the respective blade sections. Joint cover 107 for the first section and joint cover 207 for the second section, must be removed prior to assembly of the joint between the outer end 105 of the first section and the inner end 205 of the second section. As illustrated, one blade section is carried on the truck bed 90 in this arrangement. However, transporters may carry fixtures that support two units of the same blade section or units of different blade sections.

When the transporting truck arrives at the wind, farm site, unloading should occur as soon as possible to free up the truck for other loads. It is also more efficient and economical to limit the number of movement operations for the blade. Therefore, it may be desirable to align and clamp together adjacent sections of a blade while one of the adjacent sections is still mounted on the transport fixture of the truck bed, and then move the clamped blade off the truck bed to a pad or other convenient location on the ground for storage until ready for final steps of assembling the joint or until the blade is to be mounted. An inventive self-aligning blade joint structure is provided to facilitate assembly of blade sections. Further, an inventive method is provided to utilize the self-aligning blade joint structure for assembly of the blade sections. While the assembly of blade sections may be described with respect to alignment with one section mounted on a truck, the alignment structure and method are suitable for other transporters, including rail. Further, the alignment structure and method are also contemplated for other situations where the blade sections may have been off-loaded from the transporter and are stored on suitable fixtures on the ground.

Figure 4A:
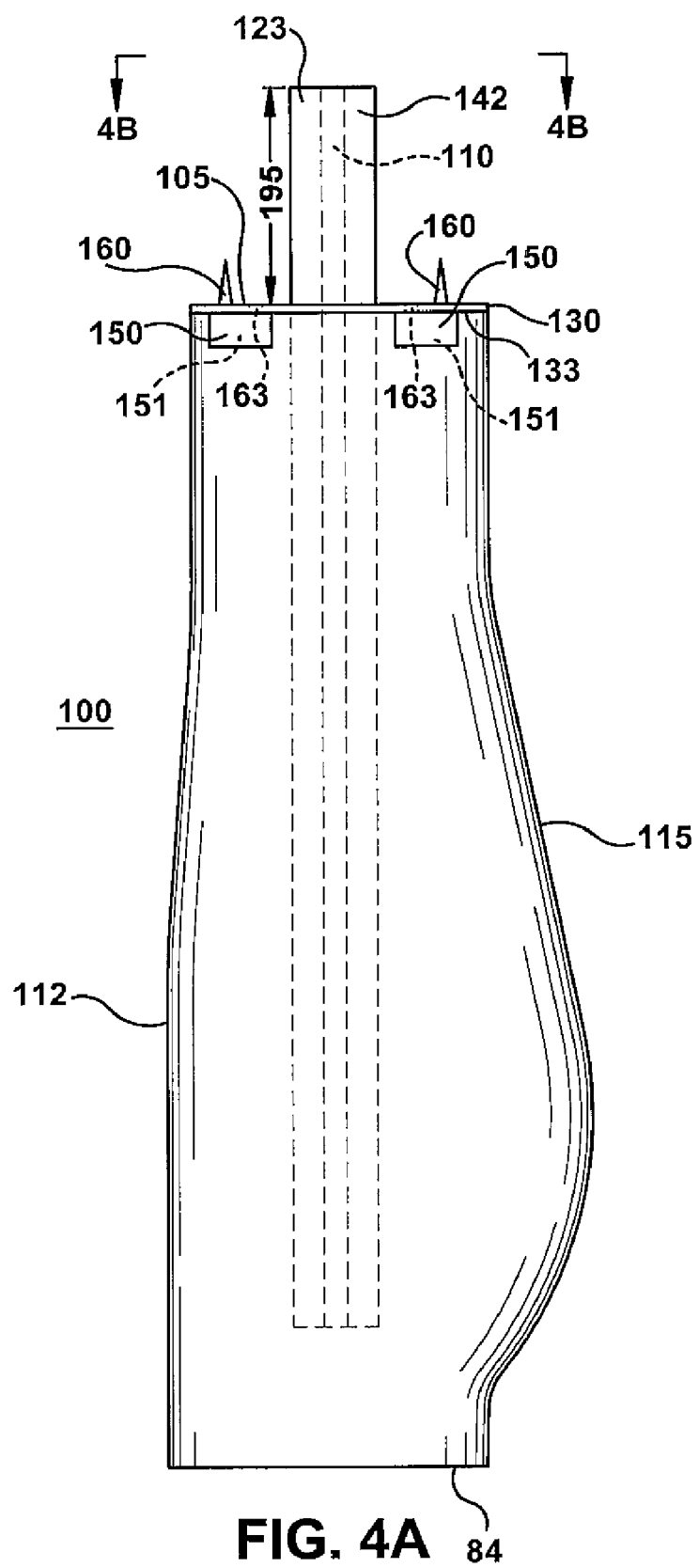
FIG. 4A illustrates a longitudinal top view of a first section of an embodiment of the wind turbine blade
Figure 4B:
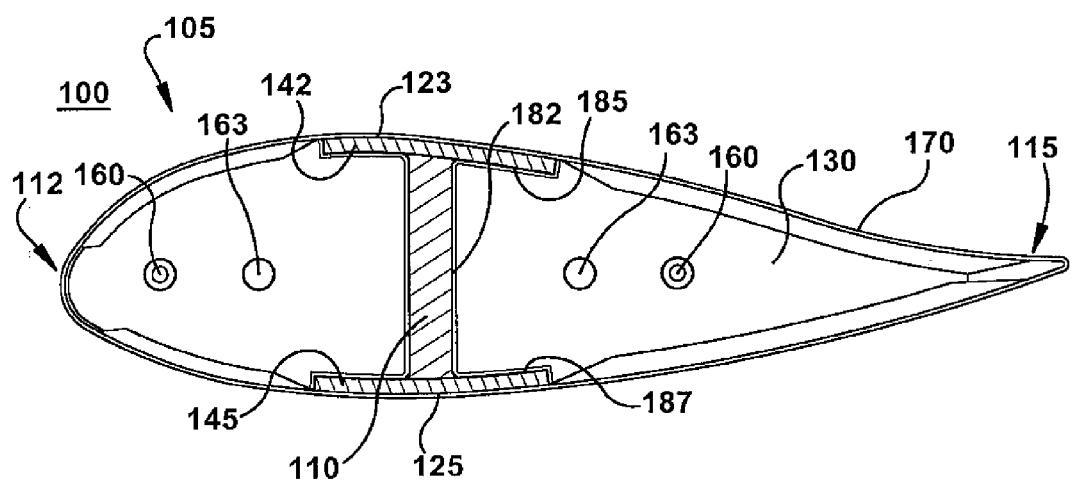
FIG. 4B illustrates an exterior cross-sectional view at the outer end of the first section of a blade.
Figure 4C:
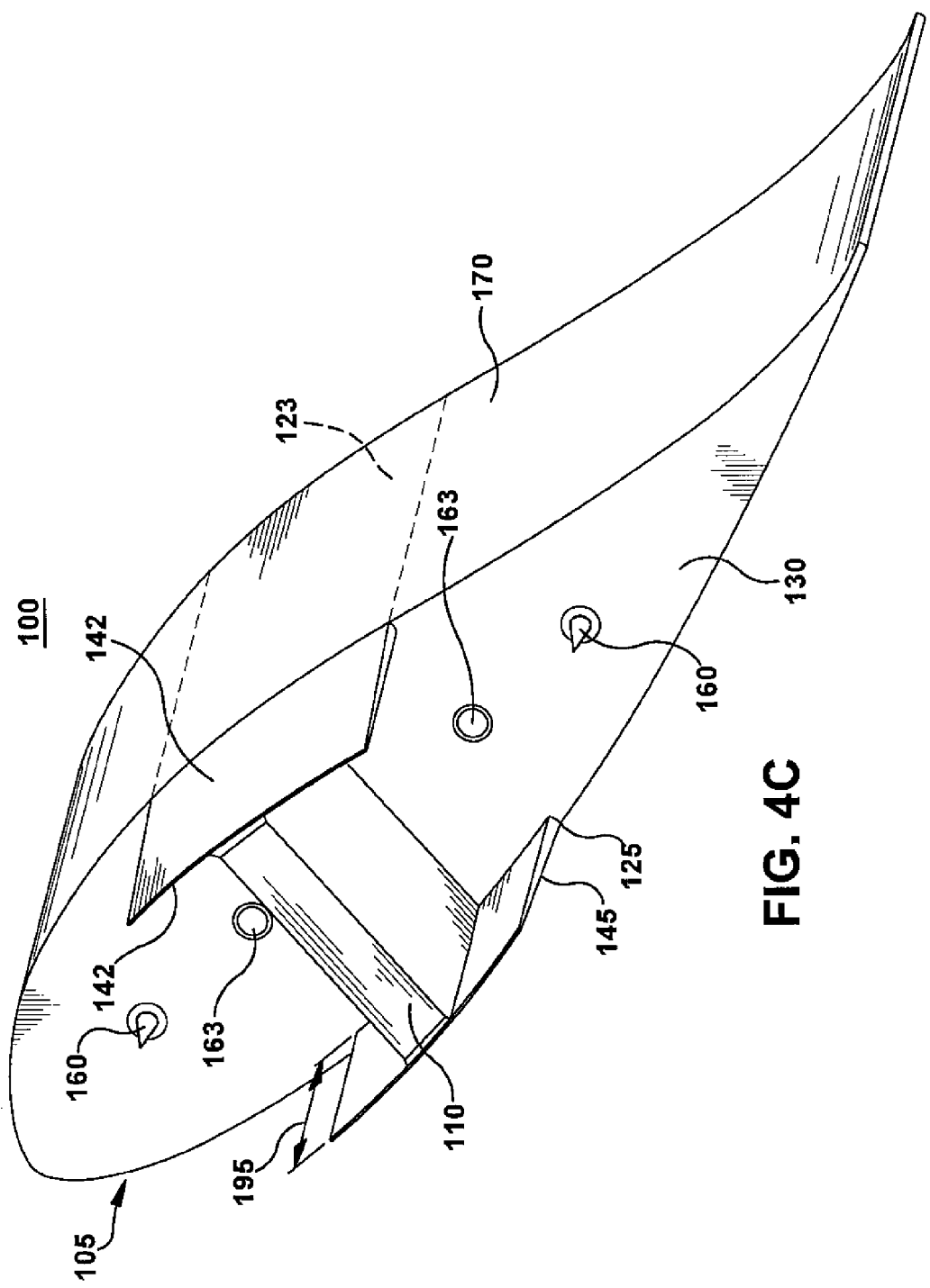
FIG. 4C illustrates an isometric view at the outer end of an embodiment of the first section of the blade.

FIG. 4A illustrates a longitudinal top view of a first section 100 of an embodiment of the inventive structure for the wind turbine blade. FIG. 4B illustrates an exterior cross-sectional view at the outer end 105 of the first section 100 of a blade 24. FIG. 4C illustrates an isometric view at the outer end 105 of an embodiment of the first section of the blade 24.

The first section 100 may include a root (also known as hub or base) section of the blade, but may also be any section of the blade forming the inboard portion of a transverse joint between sections. The blade section provides strengthening members known as shear webs and also includes longitudinal bending load bearing structures also known in the pertinent art as "spar caps". At least one shear web 110 may run longitudinally along an internal cavity of the first section 100. One shear web is shown for the present embodiment. Spar caps 123, 125 may also run longitudinally along the first section, being attached to the at least one shear web 110 and positioned between the shear web 110 and the shell 170. The outer end 105 of the body of the first section may include a transverse bulkhead 130 substantially occupying the cross-section of the blade. The transverse bulkhead 130 may be fixed around its periphery to the shell 170 of the first blade section, at the outer end 105. The bulkhead 130 provides structural strength to the blade section and includes provisions for alignment and clamping of the first section of the blade to the second section. Male scarfed surfaces 142, 145 of the spar caps 123, 125 extend from the outer end 105 of the first section 100. The shear web 110 and the male scarfed surfaces 142, 145 may extend beyond the outer end 105 of the first section. The male scarfed surfaces 142, 145 are formed at the outer end of the spar caps 123, 125. The shear web 110 and the male scarfed surfaces 142, 145 may extend a predetermined distance 195 beyond the outer end of the first section 100.

Access port covers 150 may be provided on at least one of the top and bottom surfaces of the first blade section 100. The bulkhead 130 may provide a plurality of male alignment pins 160 for fine alignment with a second section 200 as it engages the first section 100. The bulkhead 230 on the second section 200 may include female bushings 260 to accept the male alignment pins 160 from the first section. Alternately, the bulkhead 130 may provide female bushings (not shown) to accept male alignment pins (not shown) from the bulkhead 230 of the second section. Further for another embodiment of the alignment feature, a combination of male alignment pins 160 and female bushings (not shown) may be used on the bulkhead 130 of the first section 100 in conjunction with male alignment pins (not shown) and female bushings 260 of the second section 200. The male alignment pins 160 of the bulkhead 130 for the first section and the corresponding female bushings 260 of the bulkhead 230 for the second section 200 are precisely prealigned to ensure accurate mating of the blade sections when the respective ends 105, 205 are clamped together. The bulkhead 130 may also provide a plurality of through holes 163 for clamping the first section and the second section of the blade.

The access port covers 150 may be located adjacent to the at least one shear web 110 of the first blade section 100. One access port cover 150 may be located to the side of the leading edge 112 and one access port cover 150 may be located to the side of the trailing edge 115. Each access port cover 150 provides access to an internal cavity, access port 151, of the first section, being also located proximate to the inner side 133 of the bulkhead 130. When the access port covers 150 are open, the access ports 151 give access to the through holes 163 for the clamping operation from the first section side and for adhesive application to the joint.

The blade 24 includes an outer shell 170 formed in the shape of an airfoil section having a leading edge 112 and a trailing edge 115. A shell 170 may include a sandwich of fiberglass and a lightweight core material. One or more longitudinal crossbeams (shear webs) 110 are disposed within the airfoil section between a top spar cap 123 and a bottom spar cap 125. The at least one shear web 110 are adapted to withstand aerodynamic shear loading on the wind turbine blade 24.

Shear web 110 may extend a predetermined distance 195 beyond the bulkhead 130 of the outer end 105. Further, the top male scarfed surface 142 and the bottom male scarfed surface 145 are formed at the outer end of the associated spar caps 123, 125. The spar caps 123, 125 narrow from full thickness in the area of the bulkhead 130, the inner surface being flat and the outer surface being tapered to form the male scarfed surfaces 142, 145. The bulkhead 130 includes cutout 182 to permit the at least one shear web to extend the predetermined distance 195 outside the end of section one. The bulkhead 180 also includes a cutout 185 for the top spar cap 123 and cutout 187 for the bottom spar cap 125 to extend beyond the outer end 105 of the first section 100, thereby allowing for the projection of the male scarfed surfaces 142, 145.

Figure 5A:
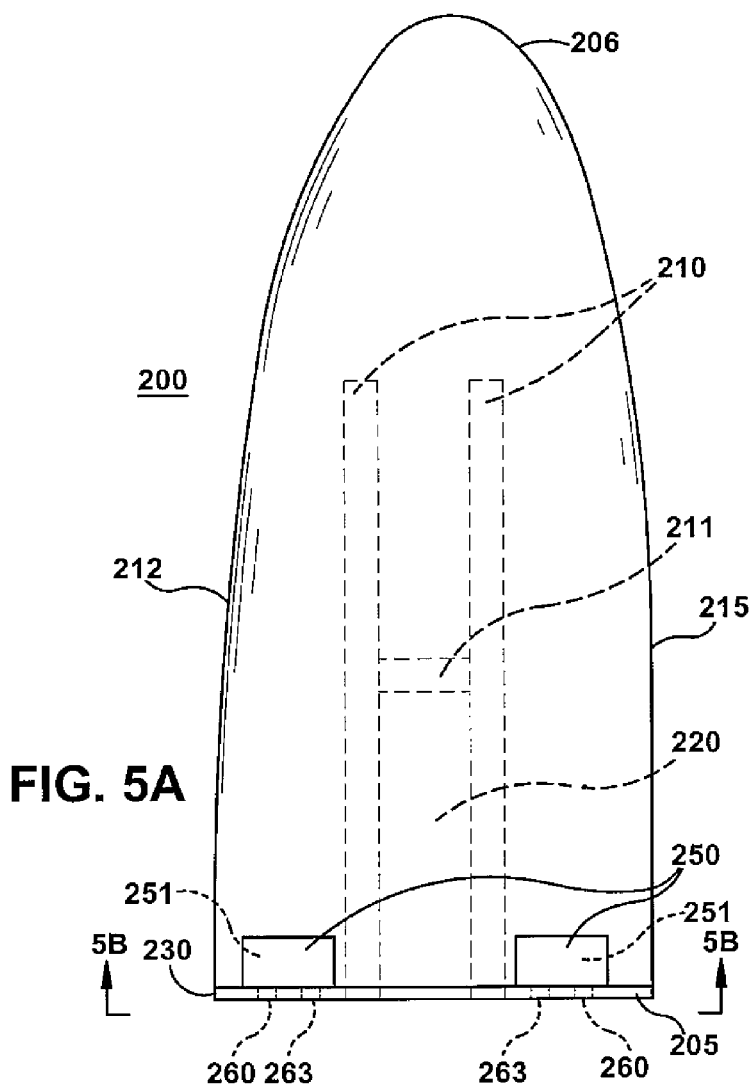
FIG. 5A illustrates a longitudinal top view of a second section of an embodiment of the wind turbine blade.
Figure 5B:
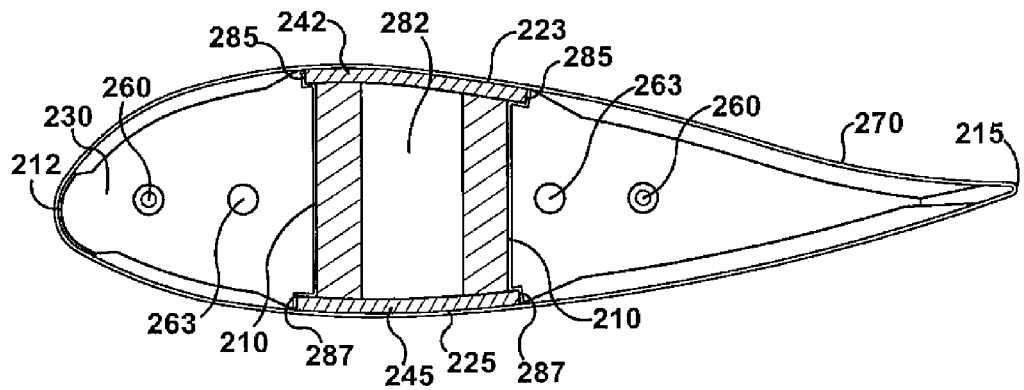
FIG. 5B illustrates an inner-end view of an embodiment of the second section the wind turbine blade.
Figure 5C:
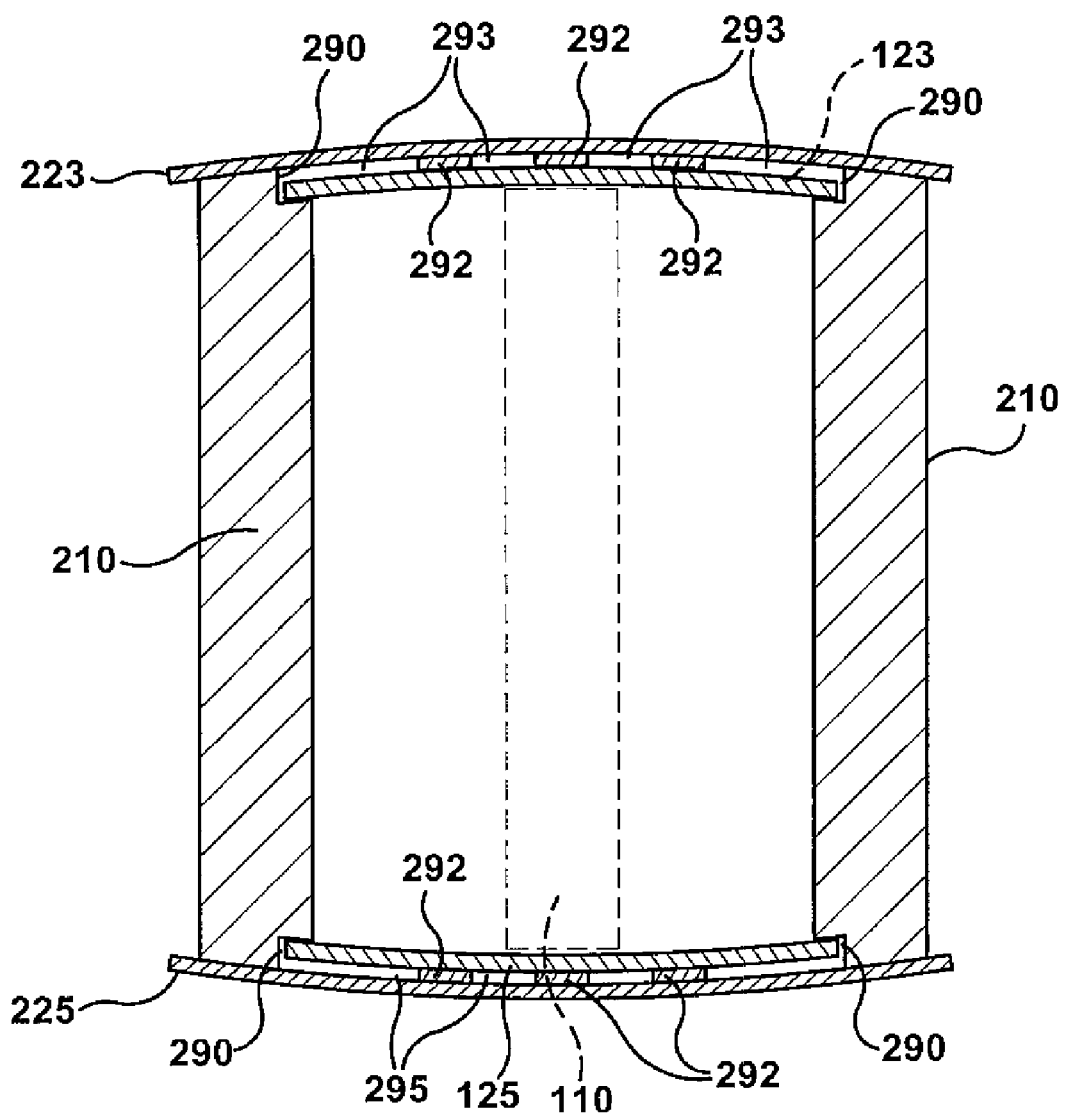
FIG. 5C illustrates an expanded view of the shear webs and spar caps at the inner bulkhead for an inner-end view of the second section of an embodiment of the wind turbine blade.

FIG. 5A illustrates a longitudinal top view of a second section 200 of an embodiment of the wind turbine blade. FIG. 5B illustrates an exterior cross-sectional view at the inner end 205 of the second section 200 of the blade 24. FIG. 5C illustrates an expanded view of the shear webs 210 and spar caps 223, 225 at the inner bulkhead 230.

The second section 200 may be a tip section of the blade, but may also be any section of the blade forming the outboard portion of a transverse joint between sections. At least one shear web 210 may run longitudinally along an internal cavity of the first section 200. Two shear webs are shown for one embodiment of the present invention (as illustrated in FIGS. 5A-5C). Spar caps 223, 225 may also run longitudinally along the second section, being attached to the at least one shear web 210 and positioned between the shear webs 210 and the shell 270. The inner end 205 of the body of the second section 200 may include a transverse bulkhead 230 substantially occupying the cross-section of the blade. The transverse bulkhead 230 may be fixed around its periphery to the shell 270 of the second blade section. The bulkhead 230 provides structural strength to the blade section and includes provisions for alignment and clamping of the second section 200 of the blade to the first section 100. Female scarfed surfaces 242, 245 of the spar caps 223, 225 may be formed near the inner end 205 of the second section 200. The female scarfed surfaces 242, 245 are formed along a predetermined distance 295 (FIG. 6A) from the inner end of the spar caps 223, 225.

As shown in FIG. 5A for one embodiment of the present invention, the shear webs 210 may extend to the inner end 205 of the second section 200 at the bulkhead 230. The spar caps 223, 225 also extend to the inner bulkhead, with a predetermined distance 295 (FIG. 6A) at the inner end of the second section 200, being female scarfed surfaces 242, 245 to provide complimentary surfaces to mate with the male scarfed surfaces 142, 145 from the first section forming an overlap 298 (FIG. 6C).

Access ports covers 250 may be provided on at least one of the top and bottom surfaces of the second blade section. The bulkhead 230 may provide a plurality of female bushings 260 for fine alignment with the male alignment pins 160 of the first section 100 as it engages the second section 200. Alternately, the bulkhead 230 may provide male alignment pins (not shown) for engagement with female bushings (not shown) on bulkhead 130. As a further alternative alignment feature, a combination of male alignment pins (not shown) and female bushings 260 on bulkhead 230 may be used in conjunction with male alignment pins 160 and female bushings (not shown) of the first section. The female bushings 260 of the bulkhead 230 for the second section and the corresponding alignment pins 160 of the bulkhead 130 for the first section are precisely pre-aligned to ensure accurate mating of the bulkhead sections when the sections are clamped together. The bulkhead 230 may also provide a plurality of through holes 263 for clamping the first section and the second section of the blade with nuts and bolts or other suitable fasteners.

The access port covers 250 of the second blade section 200 may be located adjacent to the at least one shear web 210. One access port 250 cover may be located on the side of the blade leading edge 212 and one access port cover 250 may be located on the side of blade trailing edge 215. When removed, the access port cover 250 provides access to an internal cavity, access port 251, of the second section being also located proximate to the internal side 233 of the bulkhead 230. When the access port covers 250 are open, the access ports 251 give access to the through holes 263 for the clamping operation from the first section side and for adhesive applications to the joint.

The blade 24 includes an outer shell 270 formed in the shape of an airfoil section having a leading edge 212 and a trailing edge 215. The shell 270 may include a sandwich of fiberglass and lightweight core material. One or more longitudinal crossbeams (shear webs) 210, are disposed within the airfoil section between a top spar cap 223 and a bottom spar cap 225.

Referring to FIG. 5C, cutouts 282 and 285 allow the shear web 110 and the male scarfed surfaces 140 from section one to penetrate the bulkhead 230. The shear webs 210 of the second section also include cutouts 290 on the inboard side at the top end and bottom end. The cutouts 290 allow the male top scarfed surface 142 and the male bottom scarfed surface 145 of the first section 100 (shown in phantom) to pass at full width into the cavity of the second section 200 for forming scarfed joints with the top female scarfed surface 242 and the bottom female scarfed surface 245 of the second section 200. The extended shear web 110 of the first section is also shown in phantom. A plurality of spacers may be formed between the top female scarfed surface 242 and the top male scarfed surface 142 and between the bottom female scarfed surface 245 and the bottom male scarfed surface 145 to provide injection spaces 293, 295 for injection of adhesive for bonding the surfaces for formation of the joint between the blade sections.

Figure 6A:
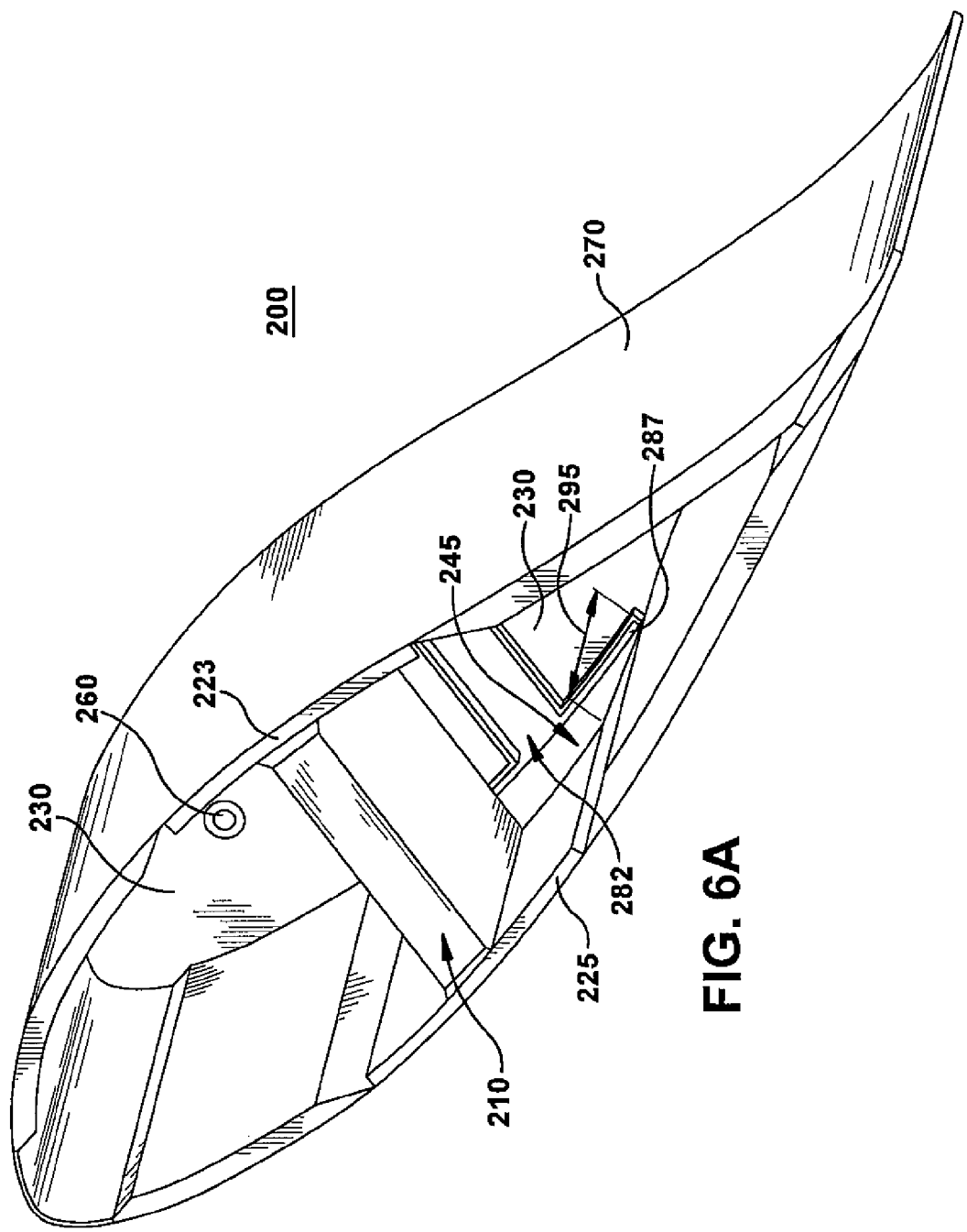
FIG. 6A illustrates an isometric view at the inner end of a further embodiment of the second section of the blade.

FIG. 6A illustrates an isometric view at the inner end 205 of a further embodiment of the second section 200 of the blade 24. A single shear web 210 runs longitudinally along a midpart of the second section. The single shear web 210 may be recessed to permit the second section 200 to accept the complimentary extended shear web 110 from the first section. Cutout 282 and top and bottom spar cap cutouts 285 (only bottom cutout 285 shown) in the bulkhead 230 provide access into the second section for the shear web 110 and the male scarfed surfaces 140 from the first section. The top female scarfed surface 242 and the bottom female scarfed surface 245 are formed from a taper of the respective top spar cap 223 and bottom spar cap 225 starting at full thickness at a predetermined distance outboard from the inboard surface of bulkhead 230 and tapering along the predetermined distance 295 to the bulkhead 230.

Figure 6B:
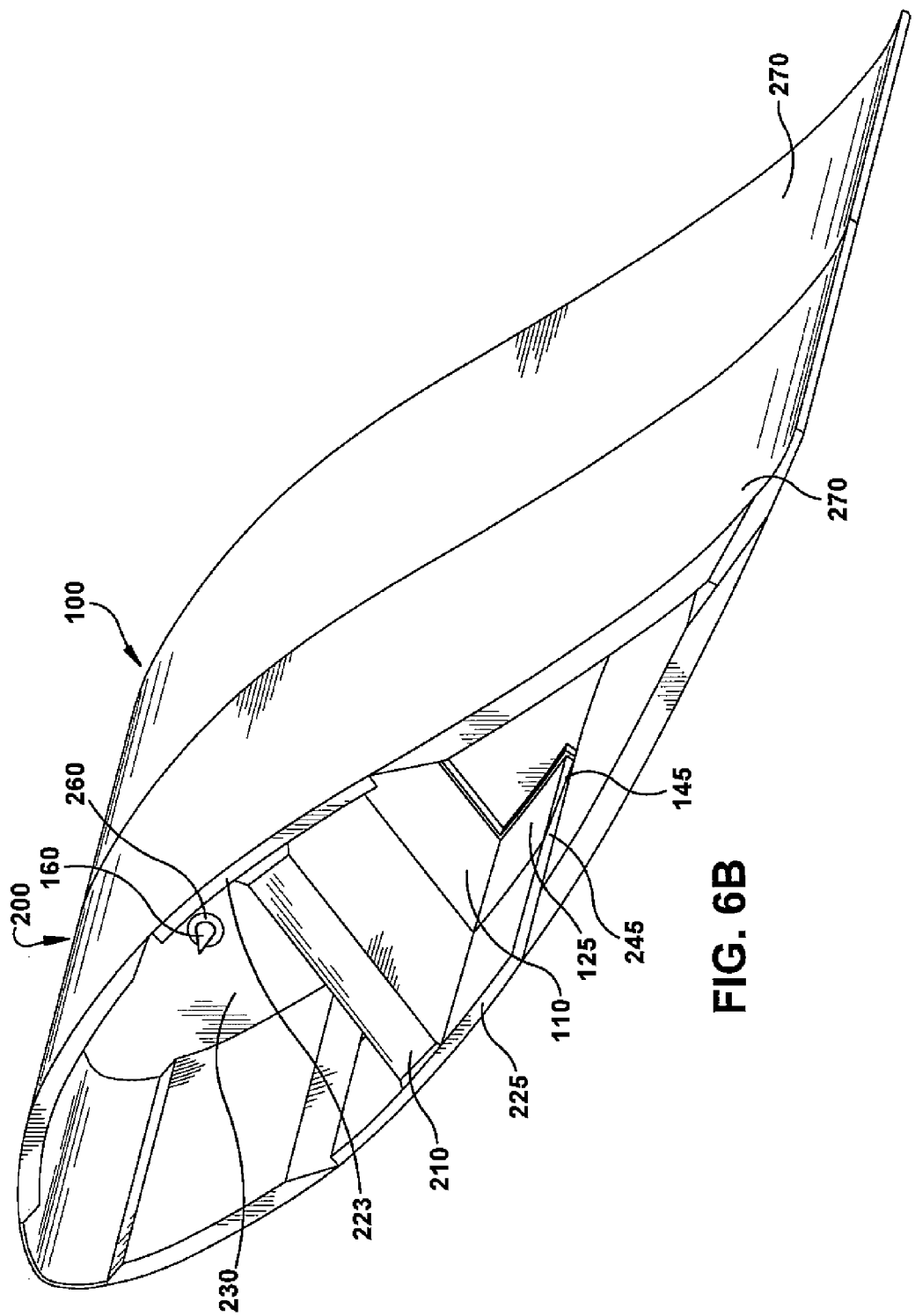
FIG. 6B illustrates the assembled joint for the first and second sections for the embodiment of the inventive structure with a single shear web from the first section extending through the bulkhead of the second section.
Figure 6C:
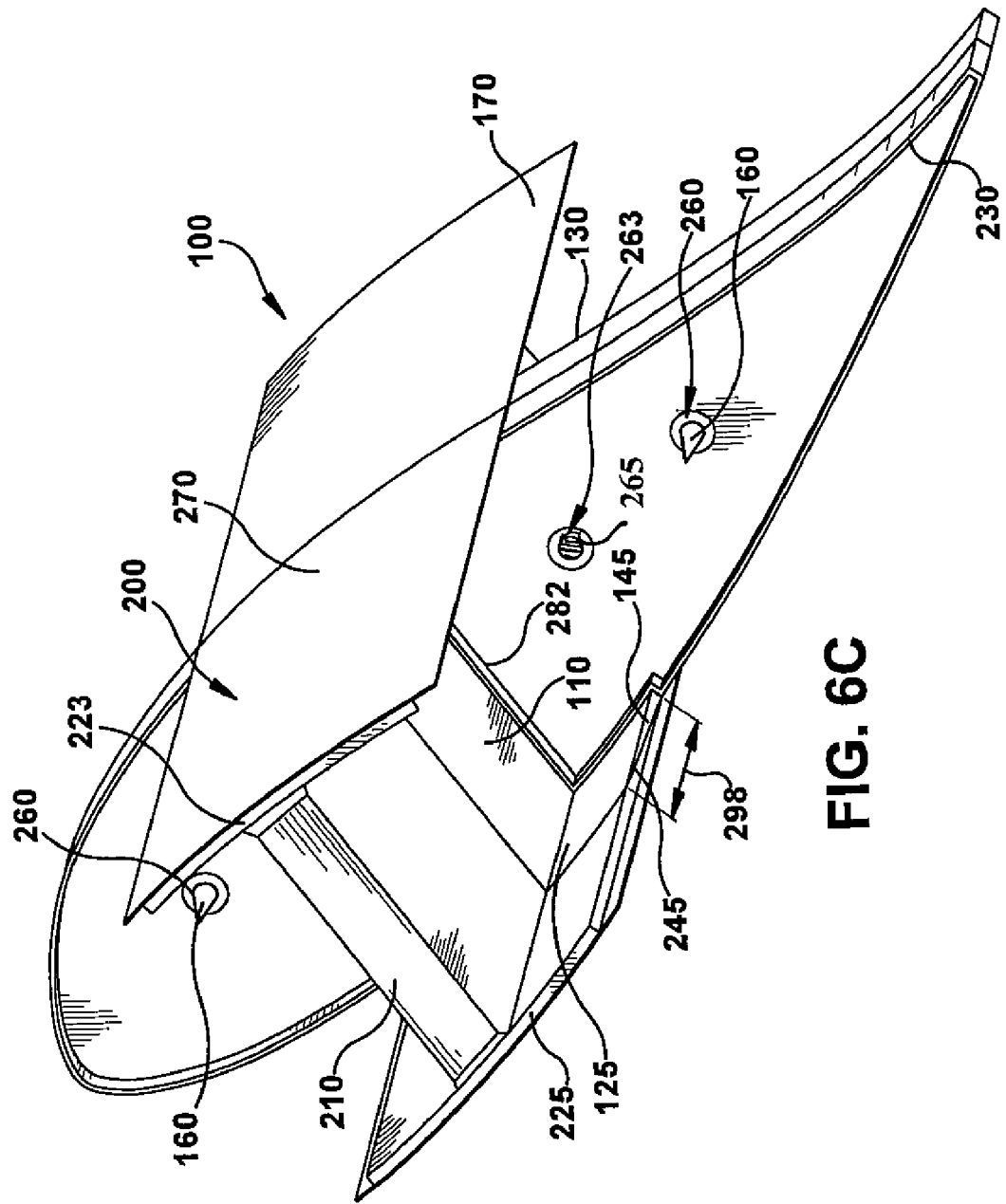
FIG. 6C illustrates an isometric view from the second section for an embodiment of the joint for a first section and a second section of an assembled wind turbine blade with the shell removed.

FIG. 6B illustrates the assembled joint for the first and second sections for the embodiment of the inventive structure with the single shear web 110 from the first section 100 extending through the bulkhead 230 of the second section 200. The corresponding bottom male scarfed surface 145 of bottom spar cap 125 and bottom female scarfed surface 245 of bottom spar cap 225 are mated. The corresponding top male scarfed surface 142 of top spar cap 123 and the top female scarfed surface 242 of top spar cap 222 are also mated (but not shown).

FIG. 6C illustrates an isometric view from the second section for an embodiment of the joint for a first section and a second section of an assembled wind turbine blade with the shell removed. Removal of the shell surfaces 170, 270 more clearly illustrates the overlap 298 of the scarfed surfaces 142 and 242 and 145 and 245 of the spar caps in both sections. The bulkhead 130 for the first section and the bulkhead 230 for the second section are fastened together. Two representative alignment pins 160 from the first section 100 extending through the bulkhead 230 and female bushings 260 of the second section 200 and two representative through holes 263 are illustrated, however the number of alignment pins, bushings and through holes may vary based on the size, shape and weight of the blade sections. Fasteners 265 extend through the bulkheads 130, 230 via the plurality of through holes 263 to clamp the blade sections together. The shear web 110 from the first section 100 is shown extending though the bulkhead 230 for the second section 200 and abutting the single shear web 210 of the second section. Location of the shear web abutment can be shifted to either side of the bulkhead to optimize system joining or improve access to the joint.

Figure 6D:
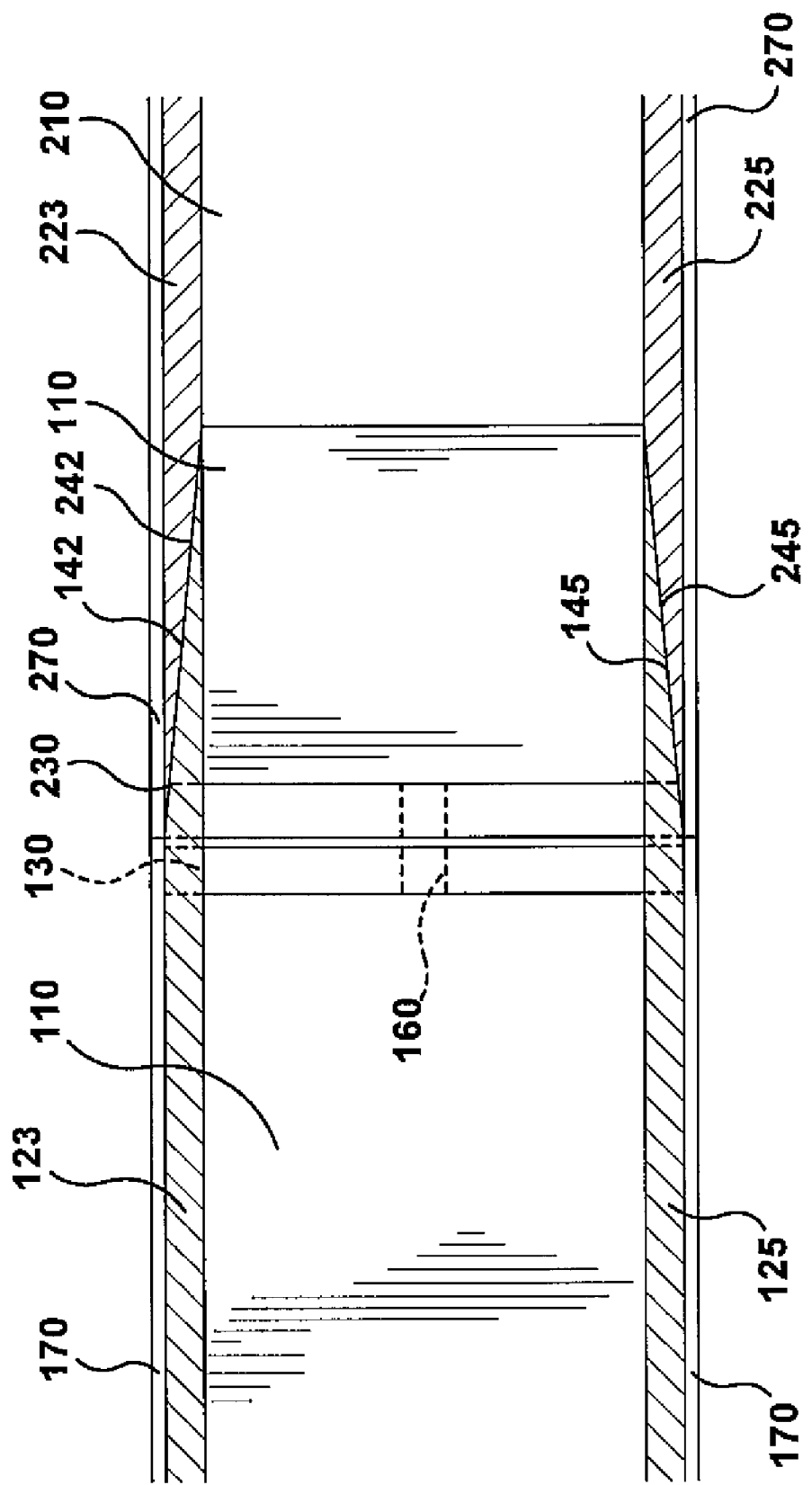
FIG. 6D illustrates an internal side view of a longitudinal section of the inventive structure for the blade joint.

FIG. 6D illustrates an internal side view of a longitudinal section of the blade joint. Shear web 110 extends through bulkhead 130 of the first section 100 beyond the outer end 105 of the first section 100 and through bulkhead 230 of the second section 200 reaching into the cavity of the second section 200. Shear web 210 is recessed from the joint a corresponding distance. The top male scarfed surface 142 of top spar cap 123 and bottom male scarfed surface 145 of bottom spar cap 125 are positioned between the shear web 110 and the shell 170 of the first section 100. The top female scarfed surface 242 of top spar cap 223 and bottom male scarfed surface 145 of bottom spar cap 225 are positioned between the shear web 210 and the shell 270 of the second section 200. The male scarfed surfaces 142, 145 extend from bulkhead 130 and through bulkhead 230 a predetermined distance 195 into the second section. Overlap 298 of the top male scarfed surface 142 with the top female scarfed surface 242 and the bottom male scarfed surface 145 with the bottom female scarfed surface 245 permits a strong joint to be formed between the first and second blade sections. The scarfed surfaces may be joined by a variety of adhesive compounds, injected by a variety of means, which are not the subject of the present invention.

The previously described embodiments of the scarfed joint between a first blade section and a second blade section recite a male scarfed surface extending outward beyond the end of the first blade section and a female scarfed surface recessed within the inner end of a second blade section. Further, the previously described embodiments recite a shear web of the first blade section extending into the second blade section. It should be recognized that an alternate embodiment of the present invention may include male scarfed surfaces extending from the top spar cap and the bottom spar cap for the second blade section a predetermined distance inward beyond the inner end of the second blade section, and female scarfed surfaces on the top spar cap and the bottom spar cap of the first blade section extending inward by a predetermined distance from the outer end of the first blade section.

A method is further provided for aligning and clamping body sections of a multi-section wind turbine blade, including a first section and a second section. During assembly, a second section 200 may be hoisted using a crane or other suitable mechanism. The second section 200 may be hoisted directly from a fixture on a transporter such a flat bed truck or may be hoisted from a fixture on the ground. The transporter for the second section may hold both the second section and a different section of the blade (such as a first section) on the same bed. Alternatively, one transporter may carry one or more first blade sections while a different transporter may carry one or more second blade sections. The blade assembly may take place with a section remaining on the transporter or with both blade sections taken off the transporter and placed on fixtures on the ground.

The second section may be oriented during the lift to facilitate assembly with first section. As shown in FIG. 3, the first section on the transporter may preferably carried with the leading edge facing down and the trailing edge facing upward in the fixture on the transporter. During transport and during the hoist, the second section should be similarly oriented. However, the method may be performed with other blade orientations, as required. In preparation for getting access to the internals of the blade in the area of bulkheads at the outer end of the first section and the inner end of the second section, the joint covers and the blade access port covers may be removed. The joint covers protect the joints from physical damage and weather during transit and storage. The access port covers are located in proximity to the through holes of these bulkheads and the joint sealing components within the blade section. Preferably the access port covers should be opened prior to the lift.

Alignment elements of the second section are then mated with corresponding elements of the first section. First a joint cross section for the second section is positioned in proximity to the joint cross section for the first section, by positioning the inner end surface of the second section aligned with and in parallel to the outer end surface of the first section, while maintaining a physical separation between elements of the first section and the second section. The second section is then moved toward the first section until the outermost extension of the male scarfed surfaces of the first section abut with associated cutouts in the second section. The engagement of the sections is initiated, inserting the male scarfed surfaces into the bulkhead cutouts so the male scarfed surfaces overlap with the corresponding female scarfed surfaces. The at least one shear web of the second section may be recessed so as to not interfere with the insertion of the male scarfed surfaces of the first section. If the at least one shear web of the second section is not recessed, then cutouts will be provided in the at least one shear web of the second section to accommodate the insertion of the top male scarfed surface and the bottom male scarfed surface of the first section.

Inserting the male scarfed surfaces of the first section into associated cutouts in the second section continues until the alignment pins of the bulkhead exterior surfaces abut the female bushings of the opposite bulkhead surfaces. Insertion continues so the alignment pins of one or both of the exterior end surfaces of the bulkhead will be fully engaged with the corresponding female bushings in the opposite bulkhead.

The step of clamping includes fastening the bulkhead of the first section to the bulkhead of the second section through the corresponding through holes in the bulkheads of the first section and the bulkhead of the second section. Clamping the sections together with fasteners completes engagement of the two sections. This provides enough strength to enable the combined first and second sections of the blade to be jointly lifted from the transporter. Replacing the access port covers on the clamped first section and the second section of the blade may be performed at this point or the assembly; or the opening may be temporarily covered and the access port covers replaced after the blade has been fully assembled and adhesive applied to bond the scarfed joint. To free the transporter for other hauling, the clamped blade may be hoisted from the transporter and may be set aside on the ground or a pad for later adhesive sealing of the scarfed surfaces of the joint and finishing of the shell skin over the joint.

Figure 7:
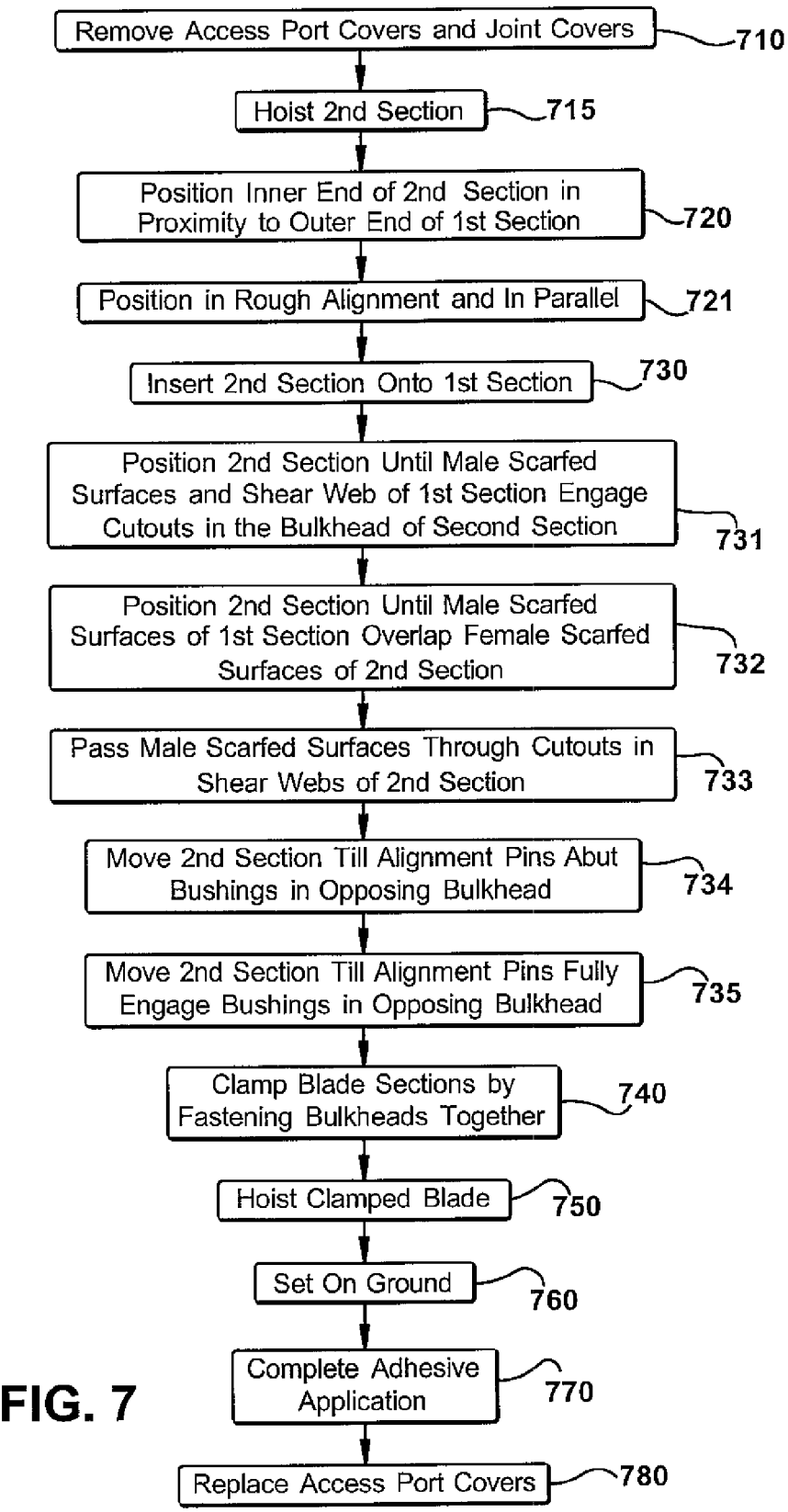
FIG. 7 illustrates a flow chart for an embodiment of a method for precision alignment of a joint between a first section and a second section of a wind turbine blade.

FIG. 7 illustrates a flowchart for a method of aligning and assembling an embodiment of the inventive joint. The procedure addresses positioning of the second section with respect to a fixed first section. It should be understood that the first section may instead be positioned with respect to a fixed second section.

In step 710 access port covers 150, 250 and the joint covers 107, 207 on the first section 100 and the second section 200, respectively, may be removed. In step 715, the second section 200 is hoisted. In step 720, the inner end 205 of the bulkhead 230 for the second section 200 is positioned in proximity to the outer end 105 of the bulkhead 130 for the first section 100. In step 721, the second section is further positioned with the inner end 205 of the second section, aligned with and in parallel to the outer end 105 of the first section with the while maintaining a physical separation between elements of the first section and the second section.

Then the second section is inserted onto the first section in step 730, as follows. The second section is moved toward the first section until the shear web 110 and the male scarfed surfaces 140 of the first section engage with associated cutouts in the second section in step 731. Then in step 732, the second section 200 is further moved toward the first section until the male scarfed surfaces 140 begin to overlap with the corresponding female scarfed surfaces 240 of the second section. In step 733, the top male scarfed surface 142 and the bottom male scarfed surface may be passed through cutouts in the shear webs 210 of the second section, if the shear webs 210 of the second section extend to the bulkhead 230 of the second section. In step 734, the second section may be further moved toward the first section until the alignment pins 160, 260 of the bulkheads 130, 230 abut the alignment holes 262, 162 of the opposing bulkhead 230, 130. In step 735, the second section is moved toward the first section until alignment pins 160, 260 of the bulkheads fully engage the alignment holes 262, 162 of the bulkhead 260, 160. The second section is clamped to the first section in step 740, which includes fastening the bulkhead 230 of the second section to the bulkhead 130 of the first section through the corresponding through holes 160 in the two bulkheads. In step 750, the clamped blade is hoisted from either the transporter or a ground pad. The clamped blade may then be set on a ground pad in step 760. Adhesive may be applied to bond the joint in step 770. When use of the access ports 151, 251 is no longer required, the access port covers 150, 250 may be replaced in step 780.

While various embodiments are described herein, it will be appreciated from the specification that various combinations of elements, variations or improvements therein may be made, and are within the scope of the invention.

What is claimed is:

1. An alignment and clamping structure for sections of a multi-section wind turbine blade, comprising:
a plurality of blade sections forming joints between adjacent blade sections, including at least a first section and a second section forming a joint;
a bulkhead mounted on the inner surface of a shell of the first section at an outer end; and a bulkhead mounted on the inner surface of a shell of the second section at an inner end; and
the bulkhead for the first section including at least one male alignment pin and at least one bushing on an exterior surface of the bulkhead of the first section and the bulkhead of the second section including at least one bushing and at least one male alignment pin on an exterior surface of the bulkhead of the second section, the at least one male alignment pin of the bulkhead for the first section being configured to be received within the at least one bushing of the bulkhead for the second section and the at least one male alignment pin of the bulkhead for the second section being configured to be received within the at least one bushing of the bulkhead for the first section.

2. The alignment and clamping structure for sections of a multi-section wind turbine blade according to claim 1, wherein the first section comprises a root section and the second section comprises a tip section.

3. An alignment and clamping structure for sections of a multi-section wind turbine blade, comprising:
a plurality of blade sections forming joints between adjacent blade sections, including at least a first section and a second section forming a joint;
a bulkhead mounted on the inner surface of a shell of the first section at an outer end;
a bulkhead mounted on the inner surface of a shell of the second section at an inner end;
at least one male alignment pin extending from an exterior surface of the bulkhead for the first section; and
at least one bushing on an exterior surface of the bulkhead for the second section, the at least one bushing being configured to receive the at least one male alignment pin,
wherein the bulkhead for the first section includes a plurality of through-holes and the bulkhead for the second section includes a corresponding plurality of complimentary through-holes, the plurality of through-holes on the bulkhead for the first section and the plurality of through-holes for the second section being precisely aligned to facilitate fastening of the first section and the second section.

4. The alignment and clamping structure for sections of a multi-section wind turbine blade according to claim 3, wherein the first section and the second section are clamped together with fasteners through the plurality of corresponding through-holes in the bulkhead for the first section and the bulkhead for the second section.

5. The alignment and clamping structure for sections of a multi-section wind turbine blade according to claim 3, wherein at least one of a top surface and a bottom surface for the first section and the second section includes a plurality of access ports providing access to the inside of the joint.

6. The alignment and clamping structure for sections of a multi-section wind turbine blade according to claim 3, further comprising:
at least one shear web, running longitudinally along a body of the first section;
a top spar cap running longitudinally along the body of the first section and oriented normal to a top surface of the at least one shear web of the first section and a bottom spar cap running longitudinally along the body of the first section and oriented normal to a bottom surface of the at least one shear web of the first section;
a scarfed surface formed at an outer end of the top spar cap of the body of the first section;
a scarfed surface formed at an outer end of the bottom spar cap of the body of the first section;
at least one shear web, running longitudinally along a body of the second section,
a top spar cap running longitudinally along the body of the second section and oriented normal to a top surface of the at least one shear web of the second section and a bottom spar cap running longitudinally along the body of the second section and oriented normal to a bottom surface of the at least one shear web of the second section;
a scarfed surface formed at an inner end of the top spar cap of the body of the second section; and
a scarfed surface formed at an inner end of the bottom spar cap of the body of the second section.

7. The alignment and clamping structure for sections of a multi-section wind turbine blade according to claim 6, wherein the scarfed surface at the outer end of the top spar cap of the first section and the scarfed surface at the inner end of the top spar cap of the second section form complimentary and overlapping scarfed surfaces, and the scarfed surface at the outer end of the bottom spar cap of the first section and the scarfed surface of the inner end of the bottom spar cap of the second section form complimentary and overlapping scarfed surfaces.

8. The alignment and clamping structure for sections of a multi-section wind turbine blade according to claim 7, wherein the scarfed surface at the outer end of the top spar cap of the first section and the scarfed surface at the outer end of the bottom spar cap of the first section comprise male scarfed surfaces, the male scarfed surfaces extending a predetermined distance outward beyond the outer end of the first section; and the scarfed surface at the inner end of the top spar cap of the second section and scarfed surface at the inner end of the bottom spar cap of the second section comprise female scarfed surfaces, the female scarfed surfaces extending a predetermined distance outward from the inner end of the second section.

9. The alignment and clamping structure for sections of a multi-section wind turbine blade according to claim 7, wherein the scarfed surface at the outer end of the top spar cap of the first section and the scarfed surface at the outer end of the bottom spar cap of the first section comprise female scarfed surfaces, the female scarfed surfaces extending a predetermined distance inward from the outer end of the first section; and the scarfed surface at the inner end of the top spar cap of the second section and scarfed surface at the inner end of bottom spar cap of the second section comprise male scarfed surfaces, the male scarfed surfaces extending a predetermined distance inward beyond the inner end of the second section.

10. The alignment and clamping structure for sections of a multi-section wind turbine blade according to claim 7, wherein the bulkhead for the outer end of the first section and the bulkhead for the inner end of the second section includes cutouts for the male scarfed surfaces.

11. The alignment and clamping structure for sections of a multi-section wind turbine blade according to claim 10, wherein the scarfed surfaces of the first section comprise male scarfed surfaced and the scarfed surfaces of the second section comprise female scarfed surfaces, the female scarfed surfaces including cutouts configured to accept the male scarfed surfaces.

12. A method for aligning and clamping sections of a multi-section wind turbine blade during assembly, including a first section and a second section with bulkheads at connecting ends of the sections wherein at least one of an alignment pin and a bushing is provided on the bulkhead at a connecting end of the first section and at least one of a complimentary bushing and a complimentary alignment pin are is provided at the opposing connecting end of the second section, the method comprising:
  hoisting the second section;
  positioning a bulkhead at the connecting end of the second section and a bulkhead at the connecting end of the first section in proximity;
  inserting the second section onto the first section;
  clamping the second section to the first section;
  hoisting the clamped blade; and
  setting the clamped blade on a ground surface.

13. The method according to claim 12, the step of hoisting the second section comprising:
  hoisting the second section from at least one of a fixture on a transporter and a fixture on a ground surface.

14. The method according to claim 12, the step of positioning the connecting end of the second section in proximity to the connecting end of the first section comprising:
  positioning a connecting end surface of the second section parallel to a connecting end surface of the first section while maintaining a physical separation between elements of the first section and the second section.

15. The method according to claim 12, the step of inserting the second section onto the first section comprising:
  moving the second section toward the first section until a male scarfed surface of the first section engages with an associated cutout in the bulkhead of the second section;
  moving the second section toward the first section until the male scarfed surface of the first section overlaps with a corresponding female scarfed surface of the second section;
  moving the second section toward the first section until the alignment pin abuts the complimentary bushing; and
  moving the second section toward the first section until the alignment pin fully engages the complimentary bushing.

16. The method according to claim 12, the step of clamping the second section to the first section comprising:
  fastening the bulkhead of the first section to the bulkhead of the second section through corresponding through-holes in the bulkhead of the first section and the bulkhead of the second section.

17. The method according to claim 12, further comprising inserting a male extension of a shear web of the first section through a bulkhead cutout of the second section until the male extension of the shear web is fully inserted into the bulkhead cutout.

18. The method according to claim 12 further comprising:
  removing joint covers for blade joints on the first section and the second section;
  removing access covers for the blade joints on the first section and the second section prior to inserting the second section onto the first section; and
  replacing the access covers for the blade joints on the first section and the second section after clamping the second section onto the first section.

19. The method according to claim 12, the step of inserting the second section onto the first section comprising:
  moving the second section toward the first section until a male scarfed surface of the second section engages with an associated cutout in the bulkhead of the first section;
  moving the second section toward the first section until the male scarfed surface of the second section overlaps with a corresponding female scarfed surface of the first section;
  moving the second section toward the first section until the alignment pin abuts the complimentary bushing; and
  moving the second section toward the first section until the alignment pin fully engages the complimentary bushing.

20. The method according to claim 12, the step of inserting the second section onto the first section comprising:
  inserting a top male scarfed surface and a bottom male scarfed surface of the first section through cutouts of at least one shear web of the second section.

21. The method according to claim 12, wherein the first section of the blade comprises a root section and the second section of the blade comprises a tip section.

* * * * *